Oct. 30, 1956     N. PLANK     2,768,646
PRESSURE OPERATED ACTUATOR FOR HIGH-PRESSURE SERVICE
Filed Jan. 12, 1953     2 Sheets-Sheet 1

Inventor: N. Plank
By: His Attorney

Oct. 30, 1956  N. PLANK  2,768,646
PRESSURE OPERATED ACTUATOR FOR HIGH-PRESSURE SERVICE
Filed Jan. 12, 1953  2 Sheets-Sheet 2

Inventor: N. Plank
By: [signature]
His Attorney

United States Patent Office 2,768,646
Patented Oct. 30, 1956

2,768,646

PRESSURE OPERATED ACTUATOR FOR HIGH-PRESSURE SERVICE

Norris Plank, East Chicago, Ind., assignor to Shell Development Company, Emeryville, Calif., a corporation of Delaware Application January 12, 1953, Serial No. 330,874

3 Claims. (Cl. 137—786)

This invention relates to pressure-operated control equipment and pertains more particularly to pressure-actuated valves, switches, etc., used in high-pressure service.

The equipment used in pumping stations of a cross-country pipe line normally operates at high pressures such as 1,000 lbs. or more. Some units or components of the control equipment for pumping stations are also subjected to and must withstand these same high pressures, although normally these components operate at pressures of only a few pounds and are required to have a high sensitivity. The presently known control valves of the spring-loaded type which are exposed to a wide range of pressures do not possess sensitivity required in many control operations, as the springs incorporated in most valves of this type are strong enough to withstand the highest pressures. Additionally, the present valves or control switches of the corrugated bellows-type cannot be used at all, as the bellows unit usually collapses under high pressures. If the bellows are of a construction sufficiently strong to withstand high pressures of, say 1,000 pounds, their sensitivity in the range of, say, 0 to 20 pounds, is greatly reduced.

It is therefore the primary object of the present invention to provide a spring-loaded pressure-operated actuator or motor of the bellows type for operating control valves or switches.

Another object of this invention is to provide a pressure-operated actuator of rugged design for withstanding high operating pressures and of high sensitivity over the range of the instrument.

A further object of this invention is to provide a pressure-operated motor or actuator for valves or switches, said motor having a high sensitivity at low pressures of from 0 to 50 pounds while being able to withstand high constant pressures or pressure surges.

These and other objects of this invention will be understood from the following description taken with reference to the attached drawing, wherein.

Figure 1:
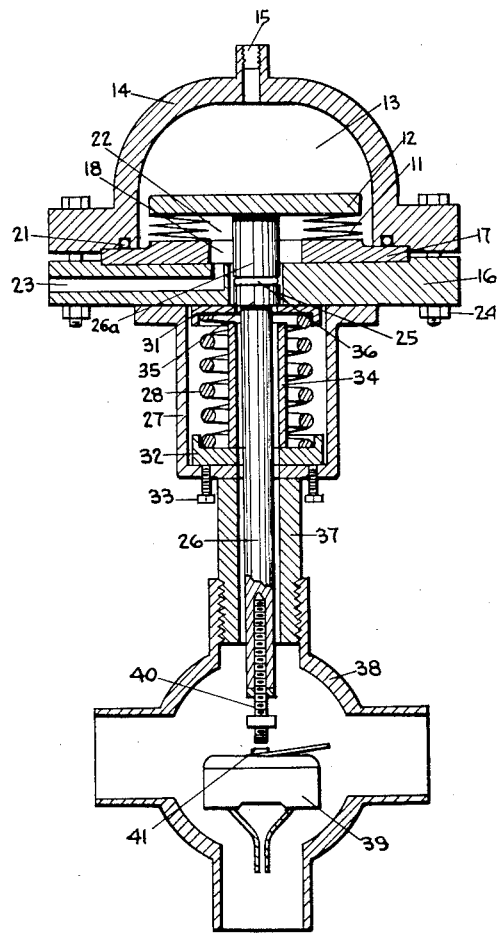
Figure 1 is a longitudinal view, partly in cross section, of the present actuator mounted for operation above an electrical switch.

Referring to Figure 1 of the drawing, the present pressure-operated actuator or motor comprises a flexible bellows unit 11 closed at the top by a heavy rigid plate 12 mounted for limited vertical movement within a chamber 13 formed within a bonnet or top housing 14. The inside diameter of the bonnet 14 is larger than the diameter of the bellows 11 thereby preventing contact of the bellows with the bonnet 14.

A fluid port 15 is provided through the wall of the bonnet 14 for admitting a pressure-fluid to the chamber 13 therein. The lower or open end of the bonnet 14 is closed by a heavy rigid plate 16. The lower side of the bellows 11 may be fixedly secured in a fluid tight manner to the plate 16 but preferably it is secured to a ring plate 17 having a hole 18 through the center thereof. Thus, the bellows 11 together with top and bottom plates 12 and 17, respectively, form a unit which may be readily removed from the bonnet 14.

When the actuator is assembled the bellows unit is fixedly secured in the bonnet 14 by the lower plate 17 which is preferably clamped between the flanged bonnet 14 and its bottom plate 16. A suitable gasket such as an O-ring seal 21 may be provided to insure a fluidtight closure. The space 22 within the bellows 11 may be vented to the atmosphere through a separate conduit 23 to permit the bellows to be readily compressed. The bonnet 14 and its bottom plate 16 may be secured together in any suitable manner as by volts 24.

Since corrugated metal bellows cannot withstand high pressures, the specially designed bellows 11 of the present invention comprises a plurality of substantially flat washers of flexible metal, each washer being joined to the outer edge of the adjacent washer on one side and to the inner edge of the adjacent washer on the other side. The edges of adjacent washers may be joined in any suitable fluidtight manner as by crimping, welding, or fusing. Thus, an accordion-like bellows is formed, in a manner well known in the art, which bellows may be folded substantially flat and withstand high outside pressures.

The base plate 16 is provided with a hole 25 through the center thereof through which an actuaor rod or stem 26 extends. The upper slightly enlarged end 26a of the actuator rod 26 is in contact with the top plate 12 of the bellows unit and, if desired, it may be welded or otherwise attached thereto. The rod 26 is moved downward in opposition to spring pressure when a pressure fluid is applied to chamber 13 and bellows 11.

The spring unit comprises a spring housing 27 in which a compression spring 28 is mounted between a movable spring seat or follower plate 31 and a normally stationary fixed seat 32. Set screws 33 or other means may be provided in the housing for adjusting the setting of the fixed seat 32 and hence the compression of the spring 28. Means for limiting the amount which the spring 28 can be compressed may be provided, as by a sleeve 34 positioned between the spring seats 31 and 32. Hence, when the top seat 31 is forced down against the sleeve 34, the spring 28 can be compressed no further.

The actuator rod or stem 26 extends through spring 28, spring seats 31 and 32 and through the bottom of the spring housing 27. The rod 26 is provided with suitable means, as by a shoulder 35, for contacting the movable spring plate 31. Thus, as the rod 26 is forced downward, its shoulder 35 bears against the spring seat 31 so that it moves in opposition to the spring force. If desired, suitable packing may be employed to provide a suitable seal 36 between the rod 26 and the bottom plate 16.

The actuator rod may be utilized to actuate any device or control mechanism to which it may be fixedly secured or with which it is in mechanical contact. As illustrated in Figure 1, the present actuator device may be mounted above a tubular member 37 and conduit junction box 38 with the rod 26 extending into said box 38 to actuate an electrical microswitch 39 fixedly positioned therein. If desired, an adjustable contact screw 40 may be threaded into the lower end of the actuator rod 26 and set at the desired position above the contact 41 on switch 39.

The above-described pressure-responsive actuator and switch may be employed in many high-pressure installations wherein it is desired to close a switch when the pressure has dropped below a minimum value. For example, with the inlet pressure port 15 of the bonnet 14 in communication with the intake pump pressure of a centrifugal pipe line pump and with the switch 39 electrically connected into the pump energizing circuit, the device would work as follows.

With the pump intake pressure, say 800 pounds, applied to the pressure chamber 13 of the actuator, the top plate 12 of the bellows 11 is forced downward to its lowest position. In this position the sections of the bellows are compressed against each other so as to lie in substantially parallel horizontal planes, this folded position protecting them from injury by high pressures. At this time the top movable ring seat 31 above spring 28 is moved downward until it is seated on the top of sleeve 34. The collapsed bellows 11 and/or the sleeve 34 prevent the spring 28 from being subjected to the high pressures or pressure surges present in the pipe line. The actuator rod 26, being at its lowermost position, keeps the switch 39 closed.

Thus, a relatively lightweight spring 28 having a sensitivity in the order of 0.1 of a pound or less at 20 pounds pressure could be employed for providing a sensitive shutoff device for the pump. Should the intake pressure to the pump drop below a predetermined minimum pressure, say 20 pounds, the pressure in chamber 13 would be reduced below 20 pounds thus allowing spring 28 to push the actuator rod 26 upwardly away from switch 39 which automatically opens to shut down the pump and prevent cavitation of the pump. Hence, it may be seen that the spring 28 has pressures of between 0 and 20 pounds applied to it and is not affected by higher pressures applied to chamber 13. At the same time the bellows 11 or its top plate 12 is not injured by pressures up to 1,000 pounds or more as the bellows are folded substantially flat and the plate is made of rigid stock. The 20 pound or other low pressure at which the actuator is set to operate may be varied by adjusting the position of plate 32 with set screws 33 or by substituting another spring having different characteristics.

Figure 2:
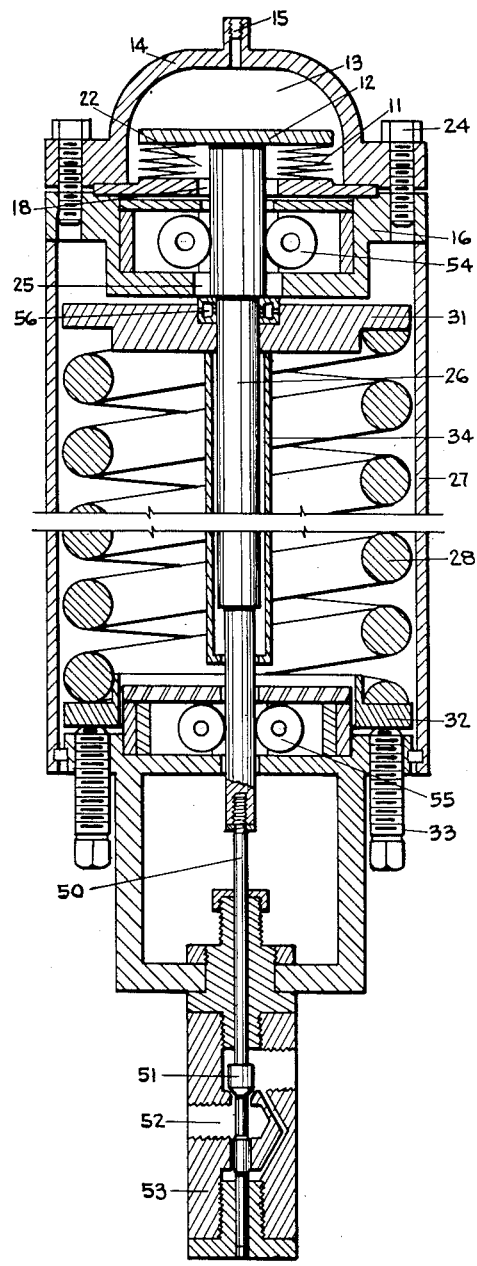
Figure 2 is a longitudinal view, partly in cross section, of the present pressure-operated actuator mounted for operation above a pilot valve.

As illustrated in Figure 2, the present pressure-operated actuator may also be mounted so that the movable rod 26 is secured, as by screw threads, to a valve stem 50 carrying a single-seated balancing piston valve 51 adapted to seat and close the flow passage 52 in the body 53 of a pilot valve. Two sets of roller guides 54 and 55, respectively, may be mounted at the upper and lower ends of the spring housing 27 to act as frictionless guides for a movable rod 26. If desired a thrust bearing 56 may be inserted between the shoulder 35 of the rod 26 and the top valve seat 31.

The actuator shown in Figure 2 operates in the same manner as the one described with regard to Figure 1. With the spring set to operate at 20 pounds, the pilot valve 51 remains closed as long as the pressure in the bonnet 14 is over 20 pounds. When the pressure in the bonnet drops below 20 pounds the spring 28 immediately raises seat 31 and rod 26 to open valve 51, thus allowing a pressure fluid to pass through conduit 52 and be utilized for control purposes.

I claim as my invention:

1. A pressure-operated actuator device for high-pressure service comprising a pressure vessel having a chamber therein, port means through the wall of said vessel for continuously applying a pressure fluid thereinto, an opening through the wall of said vessel, a flexible metallic bellows mounted within said vessel around said opening, said bellows comprising a plurality of substantially flat metallic washers, the edges of adjacent washers being alternately joined at their inner and outer edges in a pressure-tight manner whereby in one extreme position of the bellows the washers fold flat against each other and against the wall of said vessel, a rigid end plate closing the end of the bellows away from the vessel wall, conduit means in communication between the space within the bellows and the space outside the pressure vessel for venting the bellows to the atmosphere, an actuator rod extending through said bellows and said opening in the vessel wall and mounted for reciprocating movement therein, one end of said rod being in contact with the end plate of said bellows and actuated thereby, a spring abutment on said actuator rod, an anchored spring surrounding said rod and engaging the spring abutment on said rod to act in opposition to pressure applied within said chamber to the end plate of the bellows, the length of the stroke required for completely collapsing the bellows to form a rigid structure supporting the plate being less than the length of the stroke required for completely compressing the spring, whereby said spring is protected by said collapsed bellows from forces in excess of those required for completely collapsing the bellows, and screw means for adjusting the force supplied by said spring.

2. A pressure-operated actuator device for high-pressure service comprising a pressure vessel having a chamber therein, port means through the wall of said vessel for continuously applying a pressure fluid thereinto, an opening through the wall of said vessel, a flexible metallic bellows mounted within said vessel around said opening, said bellows comprising a plurality of substantially flat metallic washers, the edges of adjacent washers being alternately joined at their inner and outer edges in a pressure-tight manner whereby in one extreme position of the bellows said washers fold flat against each other and against the wall of said vessel, a rigid end plate closing the end of the bellows away from the vessel wall, an actuator rod extending through said bellows and said opening in the vessel wall and mounted for reciprocating movement therein, one end of said rod being in contact with the end plate of said bellows and actuated thereby, a spring abutment on said actuator rod, and an anchored spring surrounding said rod and engaging the spring abutment on said rod to act in opposition to pressure applied within said chamber to the end plate of the bellows, the length of the stroke required for completely collapsing the bellows to form a rigid structure supporting the plate being less than the length of the stroke required for completely compressing the spring, whereby said spring is protected by said collapsed bellows from forces in excess of those required for completely collapsing the bellows.

3. A pressure-operated actuator device for high-pressure service comprising a pressure vessel having a chamber therein, port means through the wall of said vessel for continuously applying a pressure fluid thereinto, an opening through the wall of said vessel, a flexible metallic accordion-type bellows mounted within said vessel around said opening, said bellows comprising a plurality of substantially flat metallic washers, the edges of adjacent washers being alternately joined at their inner and outer edges in a pressure-tight manner whereby in one extreme position of the bellows the washers fold flat against each other and against the wall of said vessel, a rigid end plate closing the end of the bellows away from the vessel wall, a conduit through said vessel wall and said bellows for venting the interior of said bellows to the atmosphere, an actuator rod extending through said bellows and said opening in the vessel wall and mounted for reciprocating movement therein, one end of said rod being in contact with the end plate of said bellows and actuated thereby, a spring abutment on said actuator rod, a spring housing surrounding a portion of said actuator rod, and a compression spring surrounding said rod and mounted within said spring housing, said spring being interposed between said spring abutment on said rod and said spring housing to act in opposition to pressure applied within said chamber to the end plate of the bellows, the length of the stroke required for completely collapsing the bellows to form a rigid structure supporting the plate being less than the length of the stroke required for completely compressing the spring, whereby said spring is protected by said collapsed bellows from forces in excess of those required for completely collapsing the bellows.

References Cited in the file of this patent

UNITED STATES PATENTS

| | | |
|---|---|---|
| 1,717,196 | Emmet | June 11, 1929 |
| 2,241,056 | Chilton | May 6, 1941 |
| 2,283,374 | Kronmiller | May 19, 1942 |
| 2,301,031 | Ferguson | Nov. 3, 1942 |
| 2,499,040 | Steinback | Feb. 28, 1950 |
| 2,554,659 | Branson | May 29, 1951 |
| 2,582,091 | Witt | Jan. 8, 1952 |
| 2,655,573 | Szwargulski et al. | Oct. 13, 1953 |